United States Patent
Devendran et al.

(10) Patent No.: US 9,619,400 B2
(45) Date of Patent: *Apr. 11, 2017

(54) EFFICIENT MANAGEMENT OF COMPUTER MEMORY USING MEMORY PAGE ASSOCIATIONS AND MEMORY COMPRESSION

(71) Applicants: Saravanan Devendran, Karnataka (IN); Kiran Grover, Karnataka (IN)

(72) Inventors: Saravanan Devendran, Karnataka (IN); Kiran Grover, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/781,631

(22) Filed: Feb. 28, 2013

(65) Prior Publication Data
US 2014/0173243 A1 Jun. 19, 2014

(51) Int. Cl.
*G06F 12/12* (2016.01)
*G06F 12/1009* (2016.01)
(Continued)

(52) U.S. Cl.
CPC .......... *G06F 12/1009* (2013.01); *G06F 12/08* (2013.01); *G06F 12/10* (2013.01);
(Continued)

(58) Field of Classification Search
CPC .. G06F 12/1027; G06F 9/3802; G06F 9/3836; G06F 11/3466; G06F 2212/6024;
(Continued)

(56) References Cited

U.S. PATENT DOCUMENTS 5,606,685 A * 2/1997 Frandeen ...................... 711/117
7,165,147 B2 * 1/2007 Ting et al. ..................... 711/137
(Continued)

OTHER PUBLICATIONS

Application Buffer-Cache Management for Performance: Running the World's Largest MRTG, 21st Large Installation System Administration Conference (LISA '07), 2007 (David Plonka, Archit Gupta, and Dale Carder).*

(Continued)

*Primary Examiner* — Jared Rutz
*Assistant Examiner* — Alex Olson
(74) *Attorney, Agent, or Firm* — Yudell Isidore PLLC; Parashos Kalaitzis

(57) ABSTRACT

A computer-implemented method for managing memory operations includes reading a first memory page from a storage device responsive to a request for the first memory page. The first memory page is stored to a system memory. Based on a pre-established set of association rules, one or more associated memory pages are identified that are related to the first memory page. The associated memory pages are read from the storage device and compressed to generate corresponding compressed associated memory pages. The compressed associated memory pages are also stored to the system memory to enable memory access to the associated memory pages during processing of the first memory page. The compressed associated memory pages are individually decompressed in response to the particular page being required for use during processing.

6 Claims, 7 Drawing Sheets

(51) Int. Cl.
  *G06F 12/08* (2016.01)
  *G06F 12/10* (2016.01)
(52) U.S. Cl.
  CPC ...... *G06F 12/12* (2013.01); *G06F 2212/1024* (2013.01); *G06F 2212/401* (2013.01)
(58) Field of Classification Search
  CPC ............ G06F 9/30047; G06F 9/30043; G06F 11/3471; G06F 12/0864; G06F 12/0879
  USPC ........................................................ 711/136
  See application file for complete search history.

(56) References Cited

U.S. PATENT DOCUMENTS

| | | | | |
|---|---|---|---|---|
| 7,904,660 | B2* | 3/2011 | Franaszek | 711/137 |
| 8,032,723 | B2* | 10/2011 | Sechrest et al. | 711/158 |
| 2008/0155226 | A1* | 6/2008 | Davis et al. | 711/207 |
| 2009/0177854 | A1* | 7/2009 | Dow et al. | 711/160 |
| 2011/0010722 | A1* | 1/2011 | Matsuyama | 718/103 |
| 2011/0153978 | A1* | 6/2011 | Chalemin et al. | 711/171 |

OTHER PUBLICATIONS

A Comparative Study of Set Associative Memory Mapping Algorithms and Their Use for Cache and Main Memory IEEE Transactions on Software Engineering, vol. SE-4, No. 2, Mar. 1978 (Alan Jay Smith).*
Asynchronous Parallel Algorithm for Mining Association Rules on a Shared-memory Multi-processors 1998 (David Cheung, Kan Hu, Shaowei Xia).*
Efficient search for association rules 2000 (Geoffrey I. Webb).*
Speeding up irregular applications in shared-memory multiprocessors: memory binding and group prefetching ISCA '95 Proceedings of the 22nd annual international symposium on Computer architecture pp. 188-199, 1995.*
U.S. Appl. No. 13/589,535 entitled "Efficient Management of Computer Memory Using Memory Page Associations and Memory"; Non-final office action dated Apr. 25, 2014 (39 pg).
Sarwar et al., CBR and Neural Networks Based Technique for Predictive Prefecting, G. Sidorov et al. (Eds.): MICAI 2010, Part II, LNAI 6438, pp. 221-232, Abstract, 2010.
Hou et al., The Page Scheduling Schema Exploiting Periodic Access Pattern, J. Lee (Ed.): Advanced Electrical and Electronics Engineering, LNEE, pp. 375-382, Abstract, 2011. (1 pg).
U.S. Appl. No. 13/589,535 entitled "Efficient Management of Computer Memory Using Memory Page Associations and Memory"; Notice of Allowance dated Aug. 21, 2014 (11 pg).
Hill, M.D.; Smith, AJ., "Evaluating assiciativity in CPU caches," Computers, IEEE Transactions on, vol. 38, No. 12, pp. 1312, 1630, Dec. 1989. pp. 1612-1630.
Webb, Geoffrey I.: Efficient Search for association rules 2000. pp. 99-107.
Cheung, et al.: Asynchronous Parallel Algorithm for Mining Rules on a Shared memory multi-processor 1998 (10 pg).
Smith, Alan J.: A Comparative Study of Set Associative Memory Mapping Algorithms and Their Use for Cache and Main Memory IEEE Transactions on Software Engineering, vol. SE-4, No. 2, Mar. 1978. pp. 121-130.
Plonka, et al.: Application Buffer-Cache Management for Performance: Running the World's Largest MRTG), 21st Large Installation System Administration Conference (LISA '07) pp. 63-78.

* cited by examiner

FIG. 4

| Page Frame Address 410 | Associated Pages Frame Addresses 412 | | | | | | | | | | | | | Compressed Bit 402 |
|---|---|---|---|---|---|---|---|---|---|---|---|---|---|---|
| 00001001 | 11001101 | 0 | 00111001 | 0 | 10101101 | 0 | 10101101 | 0 | 10101101 | 0 | 10100000 | 0 |
| 00111001 | 1100001 | 0 | 11110001 | 1 | 10111101 | 1 | 10101101 | 1 | 10101101 | 1 | 10111111 | 0 |
| 01101001 | 10001101 | 1 | 00110000 | 1 | 11101101 | 1 | 10001101 | 1 | 10101101 | 1 | 10101101 | 1 |
| 10101101 | 11000001 | 0 | 00110111 | 0 | 10101101 | 0 | 00001110 | 0 | 10101101 | 0 | 10101101 | 0 |
| 11101001 | 10010001 | 1 | 00111101 | 1 | 11101101 | 1 | 00001010 | 0 | 10101101 | 0 | 10100001 | 0 |
| 00000001 | 11001101 | 0 | 00110001 | 0 | 10101111 | 1 | 10011111 | 0 | 10101101 | 0 | 10100001 | 0 |
| 01010101 | 00011011 | 0 | 00110001 | 0 | 11011100 | 1 | 10101111 | 0 | 10101101 | 0 | 10001101 | 1 |
| 11111001 | 10001101 | 0 | 00110011 | 0 | 10101101 | 0 | 10101111 | 0 | 10101111 | 0 | 10101100 | 0 |

EFFICIENT MANAGEMENT OF COMPUTER MEMORY USING MEMORY PAGE ASSOCIATIONS AND MEMORY COMPRESSION

PRIORITY CLAIM

The present application is a continuation of U.S. patent application Ser. No. 13/589,535, titled "Efficient Management of Computer Memory Using Memory Page Associations and Memory Compression," filed on Aug. 20, 2012, the contents of which is incorporated herein by reference in its entirety.

BACKGROUND

1. Technical Field

The present invention generally relates to computer systems. More specifically, the present invention relates to the management of computer memory operations using memory page associations and factors to enable faster access to memory pages during processing operations.

2. Description of the Related Art

Computer systems are designed with memory and storage devices that have different access times or latencies. The access time to access a page of data from a typical dynamic random access memory (DRAM) device is on the order of 60 nanoseconds. In contrast, the access time to access a page of data from a typical hard drive or disk storage device is on the order of 4 milliseconds or 4,000,000 nanoseconds. Computer processors typically operate at very high speeds and are capable of processing data at such a fast rate that it is necessary to pre-fetch a sufficient number of memory pages from the hard drive storage device and store the memory pages to system DRAM in order to avoid the processor being idle for long periods of time. Pre-fetching of memory pages ensures that the data is ready and available for utilization by the processor when needed. Determining which memory pages should be pre-fetched is important for processor performance. If the required memory page is stored in system DRAM, processor operations can be quickly completed. However, if the required memory page is not stored in system DRAM, processor operations can stall as the processor waits for the memory page to be retrieved from the hard drive storage device.

BRIEF SUMMARY

Disclosed is a method for managing memory operations in a data processing system. The method includes reading a first memory page from a storage device responsive to a request for the first memory page. The first memory page is stored to a system memory. One or more associated memory pages are identified that are related to the first memory page by the set of association rules. The associated memory pages are read from the storage device and compressed to generate a corresponding compressed associated memory page. The compressed associated memory pages are stored to the system memory to enable faster access to the associated memory pages during processing involving the first memory page. The compressed associated memory pages are individually decompressed in response to the particular page being required for use during processing.

According to one embodiment, the method further includes determining at least one page association for the first memory page based on a pre-established set of association rules. The page association is bound to the first memory page. The associated memory pages are identified by reading the page association bound to the first memory page.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 4 illustrates an example of a page table in accordance with one or more embodiments;

DETAILED DESCRIPTION

The illustrative embodiments provide a method, system and computer program product for management of computer memory operations using cognitive factors and associations to enable faster access to memory pages during processing operations. Responsive to a request for a first memory page, the first memory page is read from a storage device. The first memory page is stored to a system memory. At least one page association is determined for the first memory page based on a pre-established set of association rules. The associated memory pages are read from the storage device and compressed to generate a corresponding compressed associated memory page. The compressed associated memory pages are stored to the system memory to enable faster access to the associated memory pages during processing of the first memory page. The compressed associated memory pages are individually decompressed in response to the particular page being required for use during processing.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
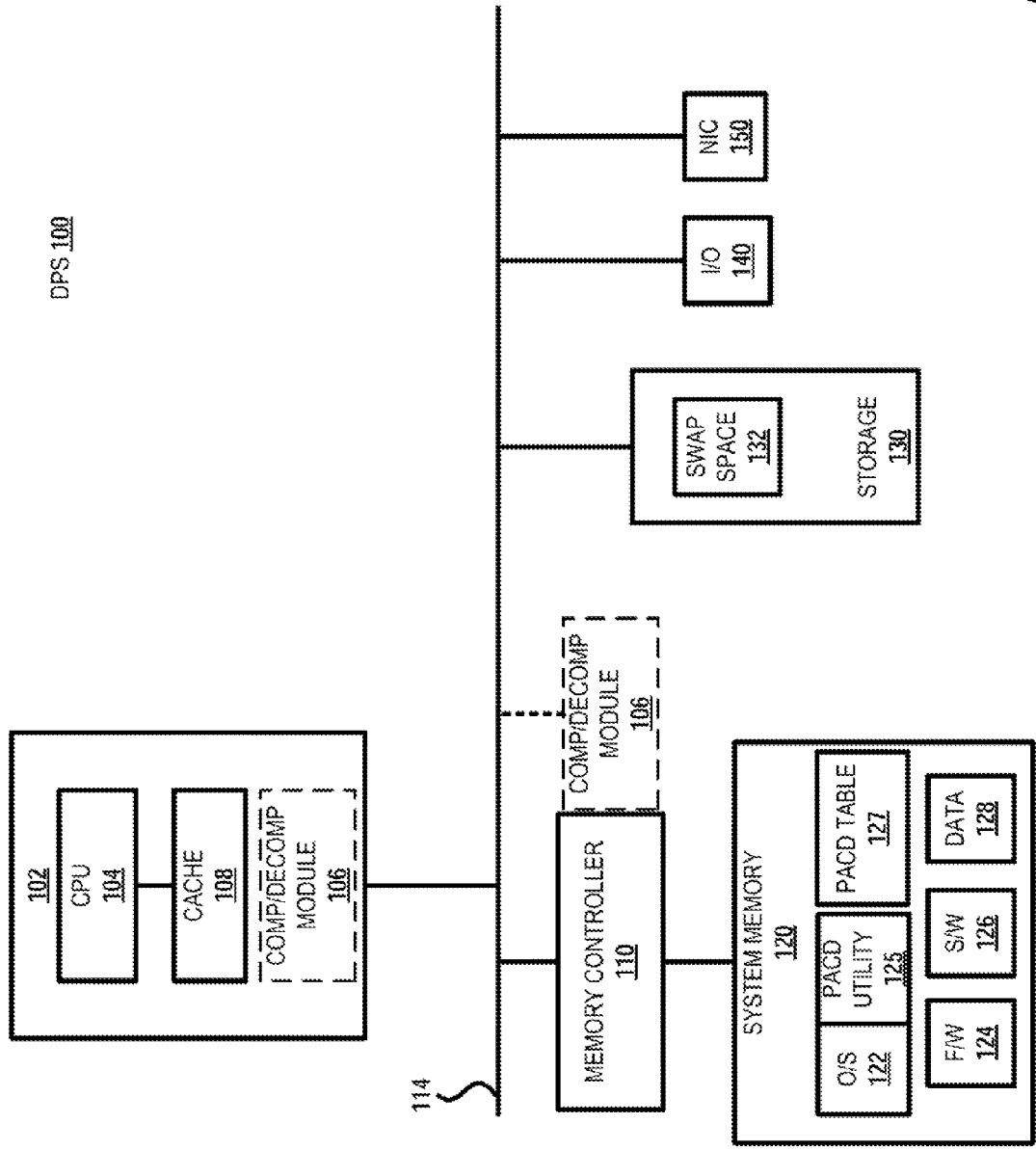
FIG. 1 provides a block diagram representation of an example data processing system within which one or more of the described embodiments can be practiced.

With reference now to the figures, and beginning with FIG. 1, there is depicted a block diagram representation of an example data processing system (DPS), as utilized within one embodiment. The data processing system can be described as having features common to a server computer. However, as used herein, the term "data processing system," is intended to include any type of computing device or machine that is capable of receiving, storing and running a software product and retrieving data/instructions from a storage device. Therefore the DPS can include not only computer systems, but also devices such as communication devices (e.g., routers, switches, pagers, telephones, electronic books, electronic magazines and newspapers, etc.) and personal and home consumer devices (e.g., handheld computers, Web-enabled televisions, home automation systems, multimedia viewing systems, etc.).

FIG. 1 and the following discussion are intended to provide a brief, general description of an exemplary data processing system adapted to implement the described embodiments. While embodiments will be described in the general context of instructions residing on hardware within a server computer, those skilled in the art will recognize that embodiments may be implemented in a combination of program modules running in an operating system. Generally, program modules include routines, programs, components, and data structures, which perform particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example DPS 100 that comprises one or more processor modules or chips 102 that include one or more central processing units (CPU), of which CPU 104 is illustrated. Throughout the description herein, the terms CPU and processor can be utilized interchangeably as referring to the same component. Processor chip 102 further includes a cache subsystem 108. Cache subsystem 108 can comprise one or more levels of caches, such as an L1 cache and an L2 cache, and one or more of the lower levels of caches can be a shared cache. Processor chip 102 is coupled to a system interconnect fabric 114 that couples other components of DPS 100 to processor chip 102. Interconnect fabric 114 in an embodiment can be an address and data bus.

System memory 120 is coupled to system interconnect fabric 114 via a memory controller 110. System memory 120 can include therein a plurality of modules and routines, including operating system (0/S) 122, firmware (F/W) 124, software (S/W) 126, and data 128. As illustrated and according to one embodiment, system memory 120 further includes page association compression/decompression (PACD) utility 125, with a corresponding PACD table 127.

In one implementation, PACD utility 125 is an enhancement and/or add-on module to OS 122. The various software and/or firmware modules have varying functionality when their corresponding program code is executed by CPU 104 within DPS 100. Thus, according to one embodiment, several of the described features of the disclosure can be provided as software code of PACD utility 125, which is executed by CPU 104. PACD table 127 can be a table mapping page associations, such as presented in FIG. 4, which is described below.

DPS 100 can further include one or more storage device 130 which is a physical computer readable storage medium, such as hard disk drives. Storage device 130 can also include solid state storage devices, optical drives, and other storage devices. As utilized herein, storage device 130 refers to any device capable of holding memory pages of data. Storage device 130 can thus include devices which are slower in access speed compared to system memory 120. DPS 100 can also include input/output devices and corresponding controllers, generally represented as I/O 140, and a network interface card (NIC) 150, among other components. NIC 150 enables DPS 100 to connect to and communicate with other remote devices and networks. Computer readable storage medium, storage device 130, includes swap space 132. Swap space 132 is a portion of storage device 130 that temporarily holds memory pages from system memory 120 that are inactive. Also illustrated as an optional hardware component within DPS 100 is compression-decompression (Comp-Decomp) module 106. Comp/Decomp module 106 can be located within processor module 102 or can be a functional module associated with, but separate from, memory controller 110, in alternate embodiments. With the alternate implementation, Comp/Decomp module 106 can be a function performed by a co-processor (assumed to be included as box 106 connected to system interconnect fabric 114). With this con-processor configuration, the co-processor is able to exploit the reference counts provided by a Hardware Page Table (see FIG. 2) in order to form associations, and the page associations can also be saved in the Hardware page table for faster access rate.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The example data processing systems depicted in FIG. 1 may be, for example, an IBM eServer pSeries system, a product of International Business Machines Corporation in Armonk, N.Y., running the Advanced Interactive Executive (AIX) operating system (Trademark of IBM Corporation) or LINUX operating system (Trademark of Linus Torvalds).

Figure 2:
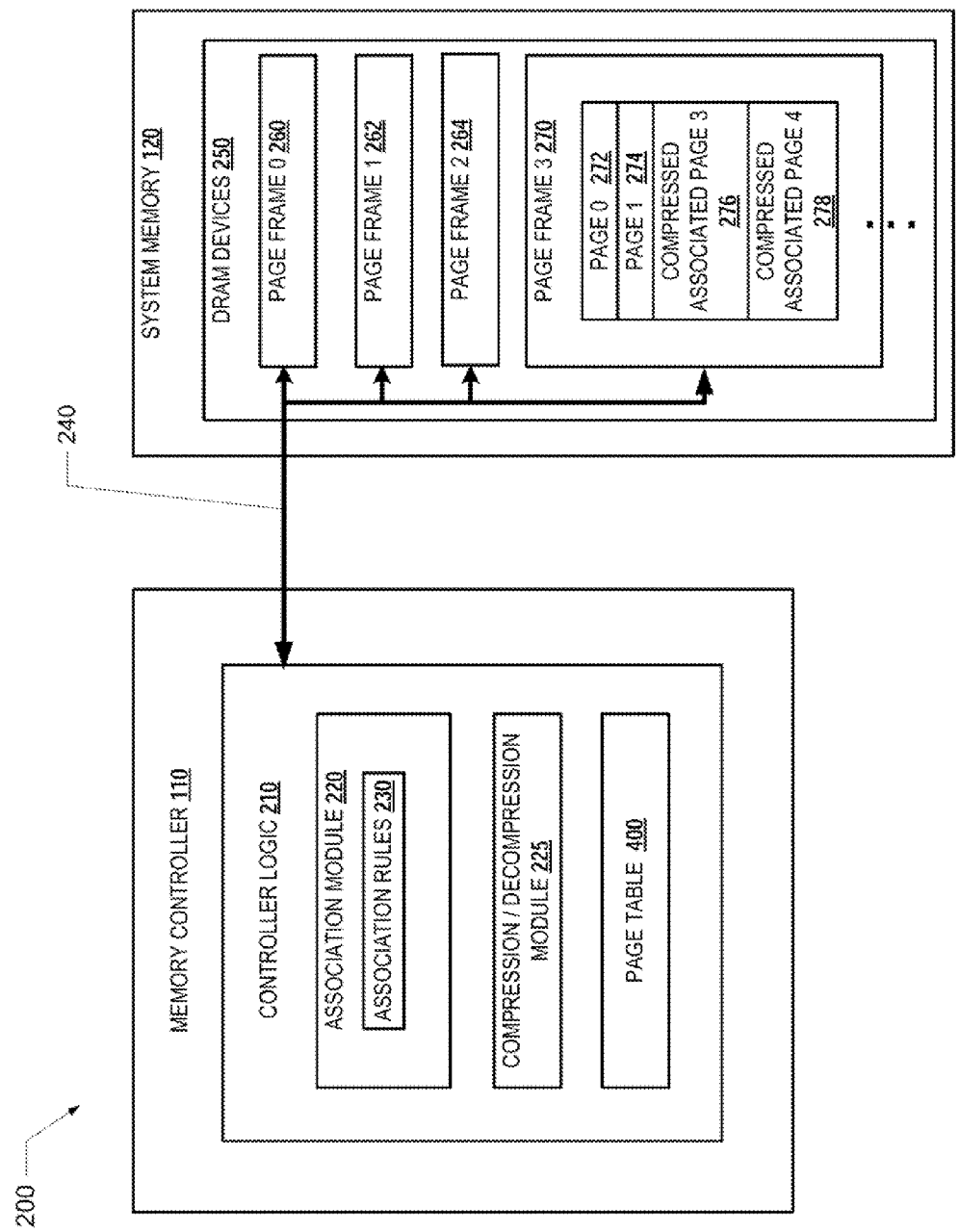
FIG. 2 illustrates a block diagram of an example memory system, in accordance with one or more embodiments.

With reference now to FIG. 2, there is illustrated one embodiment of memory subsystem 200. In the discussion of FIG. 2, reference is also made to elements described in FIG. 1. Memory subsystem 200 includes memory controller 110 and system memory 120. System memory 120 comprises one or more DRAM memory chips or devices 250 that can be accessed by memory controller 110 via a memory address and data bus 240. Each of DRAM memory chips or devices 250 contains several pages frames. In the illustrative embodiment, the example organization of DRAM memory devices 250 is illustrated having four individually accessible page frames, page frame 0 260, page frame 1 262, page frame 2 264 and page frame 3 270. The example organization of DRAM memory devices 250 is further illustrated with page frame 3 270 having four individually accessible pages, page 0 272, page 1 274, compressed associated page 2 276 and compressed associated page 3 278. While DRAM memory devices 250 is illustrated having four page frames with a page frame containing two memory pages and two compressed pages, it is contemplated that DRAM memory devices 250 can be comprised of more or fewer page frames and pages and/or compressed pages. Operating system (O/S) 122, firmware (F/W) 124 and software (S/W) 126 can be stored in and retrieved from pages 272-278 or other pages in system memory 120 through the operation of read and write commands.

Memory controller 110 contains the logic necessary to read and write to DRAM memory devices 250. Memory controller 110 comprises controller logic 210. Controller logic 210 comprises several functional modules or processes including association module 220, and compression/decompression module 225. Each of the memory controller components can communicate with each other via a communication fabric, which includes specific messaging signals communicated over specific signal lines (not illustrated). Functions, modules, routines, methods and processes of the present disclosure can be provided as firmware code and/or logic within memory controller 110. The firmware code and logic can implement association module 220 and compression/decompression module 225.

Association module 220 determines page associations between two or more memory pages such as pages 272-274. The page associations are used to determine additional associated or related memory pages to be read from storage 130 or swap space 132 and stored in system memory 120 in a compressed form such as compressed associated pages 276-278.

Compression/decompression module 225 applies a compression algorithm to the associated memory pages read from storage 130 or swap space 132 before the associated memory pages are stored to system memory 120. Compression/decompression module 225 applies a decompression algorithm to the associated memory pages removed from system memory 120 before the associated memory pages are stored to storage 130 or swap space 132. As previously stated with the description of FIG. 1, while compression/decompression module 225 is shown as a part of memory controller 110, compression/decompression module 225 could also be a component of processor 102 or could be external to memory controller 110.

Compression/decompression module 225 also decompresses compressed associated memory pages when a compressed associated memory page is required for processing. Association module 220 further includes a set of one or more association rules 230. Association rules 230 comprise cognitive correlation factors and statistics between memory pages that are used to define relationships between the memory pages. Association rules 230 can include trends in memory page access, memory page heuristics and previous trends of memory pages. The association rules 230 can determine memory access patterns and proactively identify associated or related memory pages. Controller logic 210 further includes a hardware page table 400 for translating or mapping physical page frame addresses to physical associated page frame addresses Those of ordinary skill in the art will appreciate that the hardware components and basic configuration depicted in FIGS. 1 and 2 and described herein may vary. For example, the illustrative components within DPS 100 are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 3:
FIG. 3 illustrates an example memory page, in accordance with one or more embodiments.

FIG. 3 illustrates further details of the memory pages, for example memory page 272. Memory page 272 comprises a number of bytes or bits dedicated to the storage of data 302, a page association area 310 that contains bytes dedicated to storing page associations and factors for the corresponding memory page 272, an associated memory pages area 330 that contains the physical memory address of memory pages that are associated with memory page 272 and a spare area 340 that contains bytes dedicated to other memory overhead function such as error correction. In an example embodiment, memory page 232 can contain 4096 bytes for data 302 and 128 bytes for spare area 352. Page association area 310 can contain association A 312, association B 314 for an individual memory page such as memory page 272. Page association area 310 can also contain a degree of association (DOA) A 316, DOA B 318, average associativity factor 320, differential associativity factor 322 and association quotient 324 that are calculated based on the associations for several memory pages.

Association A 312 and association B 314 contain cognitive correlation factors and statistics between memory pages that are used to define relationships between the memory pages. Forming association A 312 and association B 314 is a learning based mechanism such as described below where association rules are formed based on previous requirements or trends of memory pages.

In the association rule, let P be the one or more memory pages 272-274. Then one embodiment of an association rule can be of the form:

$$\{p \rightarrow q | p, q \in P\}$$

Where p and q are elements of P.

The degree of association (DOA) A 316 can be defined for Association A 312 on the basis of memory access trends. The average associativity factor 320 is determined or calculated using the following formula:

$$\text{Average Associativity Factor (AAF)} = (\Sigma DOA)/T$$

where T is a pre-established time period. The differential associativity factor ($\Delta$) 322 is determined using the following formula:

$$\Delta = CAF - \left(\sum_{i=0}^{T} DoA\right) / T$$

Where CAF is the current Associativity Factor and T is the pre-established time period. The differential associativity factor ($\Delta$) 322 can be used to identity if the association is a candidate for use in determining associated memory pages. The association quotient 324 can be used to determine if a defined association is consistent or will persist for a pre-established period of time. The association quotient 324 can be defined by the following formula:

$$\text{Association Quotient } (AQ) = \frac{\text{(Total Number of consistent associations)}}{\text{(Total number of Associations)}}$$

FIG. 4 illustrates an example hardware page table 400 for translating or mapping physical page frame addresses to physical associated page frame addresses. In the discussion of FIG. 4, reference is also made to elements described in FIGS. 1-3. Page table 400 comprises an array of rows and columns. The column page frame address 410 contains the physical address in system memory 120 of the memory page that is targeted for translating or mapping to the related associated memory pages such as memory pages 272-274. The columns indicated under associated pages frame addresses 412 contains the physical address in system memory 120 of the memory pages that are associated with the targeted memory page such as associated memory pages 276-278. The columns indicated under compressed bit 402 contains a bit or byte that indicates if the data held in the corresponding associated pages frame physical page frame address is in a compressed or uncompressed state. According to the illustrative embodiment, if the data held in the physical page frame is in an uncompressed state the bit is set to "0". If the data held in the physical page frame is in a compressed state the bit is set to "1". It is however appreciated that the bit settings can be reversed in an alternate embodiment. Also, when associated pages are initially pulled into memory, these pages are compressed. However, as one or more of these pages are utilized during processing, the pages are decompressed. Thus, for a given set of associated pages, some pages may be in a compressed format, while others are in a decompressed format within memory.

Figure 5:
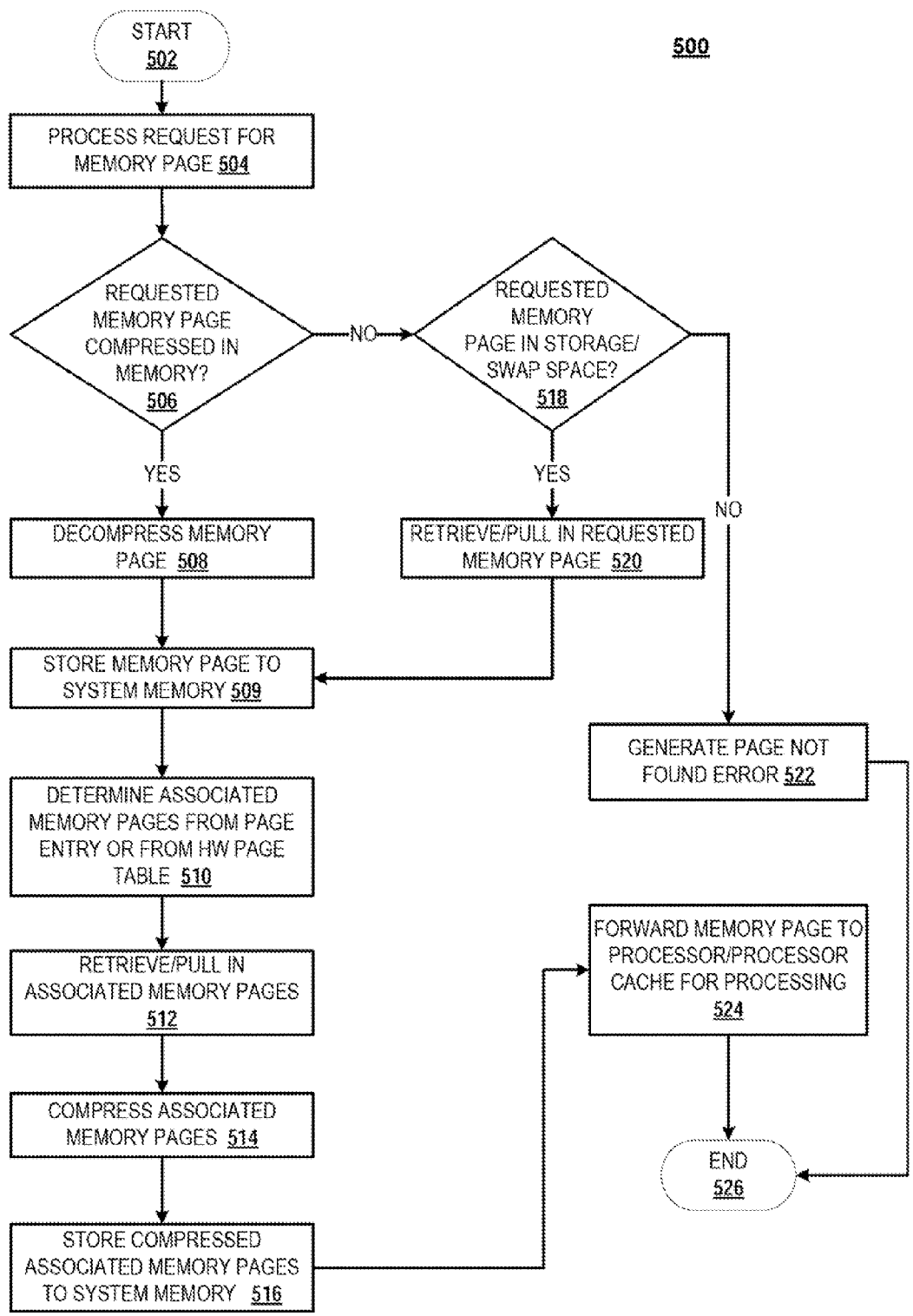
FIG. 5 is a flow chart illustrating one example of a method of retrieving memory pages from a storage device, according to one or more embodiments.

FIG. 5 illustrates a flowchart of an exemplary process for management of computer memory operations using cognitive factors and associations to enable faster access to memory pages during processing operations. Computer implemented method 500 can be implemented in DPS 100. The description of the method is provided with general reference to the specific components illustrated within the preceding figures. In the discussion of FIG. 5, reference is also made to elements described in FIGS. 1-4. Generally the method is described as being implemented via controller logic 210 and particularly the execution of code provided by firmware 124 and software 126 acting within modules 220 and 225 (FIG. 2). It is however appreciated that certain aspects of the described methods may be implemented via other processing devices and/or execution of other code.

Method 500 begins at the start block 502 and proceeds to block 504 where CPU 104 processes a request for a memory page within DPS 100. Controller logic 210 determines at block 506 whether the requested memory page is in a compressed form in memory. The requested memory page can be in a compressed form when the requested memory page is an associated memory page of a previously requested memory page and was compressed prior to being pulled into memory from storage. In response to the requested memory page not being compressed in memory, controller logic 210 determines at block 518 whether the requested memory page is in storage device 130 or swap space 132 In response to the requested memory page being in storage or swap space, controller logic 210 retrieves or pulls in the requested memory page from storage device 130 or swap space 132 (block 520) and stores the targeted memory page to system storage 120 (block 509). In response to the requested memory page not being in storage device 130 or swap space 132, controller logic 210 generates a page not found error (block 522) and method 500 then ends at block 526.

In response to the memory page being in a compressed format in memory (from block 506), compression/decompression module 225 decompresses the targeted memory page (block 508) and then controller logic 210 stores the decompressed memory page to system memory 120 (block 509).

At block 510, controller logic 210 determines the associated memory pages of the targeted/requested memory page. In one embodiment, controller logic 210 determines the associated memory pages using information from the associated memory pages area 330 that is part of the targeted memory page. In another embodiment, controller logic 210 determines the associated memory pages using a hardware page table 400 that translates or maps the associated memory pages that correspond to the targeted memory page. Controller logic 210 retrieves or pulls in the associated memory pages from storage device 130 or swap space 132 (block 512). Compression/decompression module 225 compresses the associated memory pages at block 514. Controller logic 210 stores the compressed associated memory pages to system memory 120 (block 516). Controller logic 210 then returns the memory page to the processor and/or processor cache for use in processing (block 524). Method 500 ends at block 526.

The above example process assumes the requested memory page would be in compressed form in memory. It is appreciated that in one or more implementations, the requested memory page can actually exists in memory in an un-compressed form (having been previously decompressed for processing), and that the processes of blocks 506-508-509 and potentially the processes of blocks 510-516 may have been previously completed and would therefore not be required before the memory page is forwarded to processor for processing (block 524).

Figure 6:
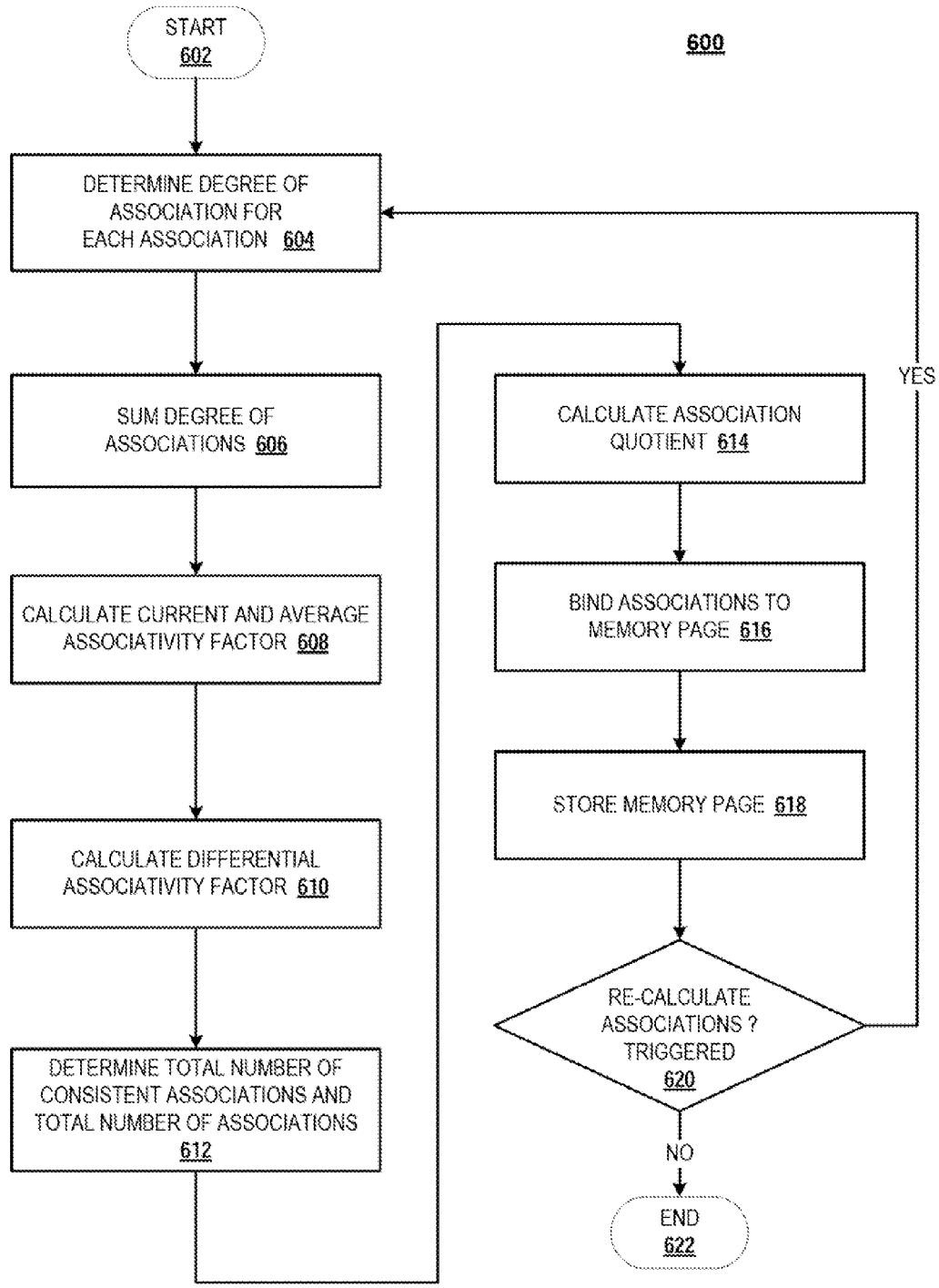
FIG. 6 is a flow chart illustrating one example of a method of determining associations for a memory page, according to one or more embodiments.

FIG. 6 illustrates a flowchart of an exemplary process for determining memory page associations and calculating cognitive factors. Computer implemented method 600 can be implemented in DPS 100. The description of the method is provided with general reference to the specific components illustrated within the preceding figures. In the discussion of FIG. 6, reference is also made to elements described in FIGS. 1-4. Generally the method is described as being implemented via controller logic 210 and particularly the execution of code provided by firmware 124 and software 126 acting within modules 220 and 225 (FIG. 2). In one embodiment, method 600 can be implemented via CPU 104. It is however appreciated that certain aspects of the described methods may be implemented via other processing devices and/or execution of other code.

Method 600 begins at start block 602 and proceeds to block 604 where association module 220 determines the degree of association 316, 318 for each page association such as page associations 312, 314. The degree of association 316, 318 can be defined on the basis of memory access trends for the targeted memory page. The degrees of association are summed for each of the page associations by association module 220 (606). Association module 220 calculates the current and average associativity factors 320 (608). The average associativity factor is defined as a sum of a degree of association for each of the page associations divided by a pre-established time period. The differential associativity factor 322 is calculated at block 610 by association module 220. The differential associativity factor 322 is defined as a current associativity factor minus a sum of a degree of association for each page association divided by a pre-established time period.

At block 612, association module 220 determines the total number of consistent page associations and the total number of page associations and association module 220 then calculates an association quotient 324 (614). The association quotient 324 is defined as a total number of consistent page associations divided by a total number of page associations. Controller logic 210 links or binds the page associations 310 to the targeted memory page (616) and then stores the memory page (618). Controller logic 210 determines at block 620 if one or more trigger conditions to re-calculate the page associations has occurred. In one embodiment, the trigger condition can be the expiration of a pre-established timer. In another embodiment, the trigger condition can be based on memory access trends or the frequency of use of the targeted memory page. In response to triggering re-calculating of the page associations, method 600 returns to block 604 where association module 220 continues to determine the degree of association 316, 318 for each page association. In response to re-calculating of the page associations not being triggered, method 600 ends at block 622.

Figure 7:
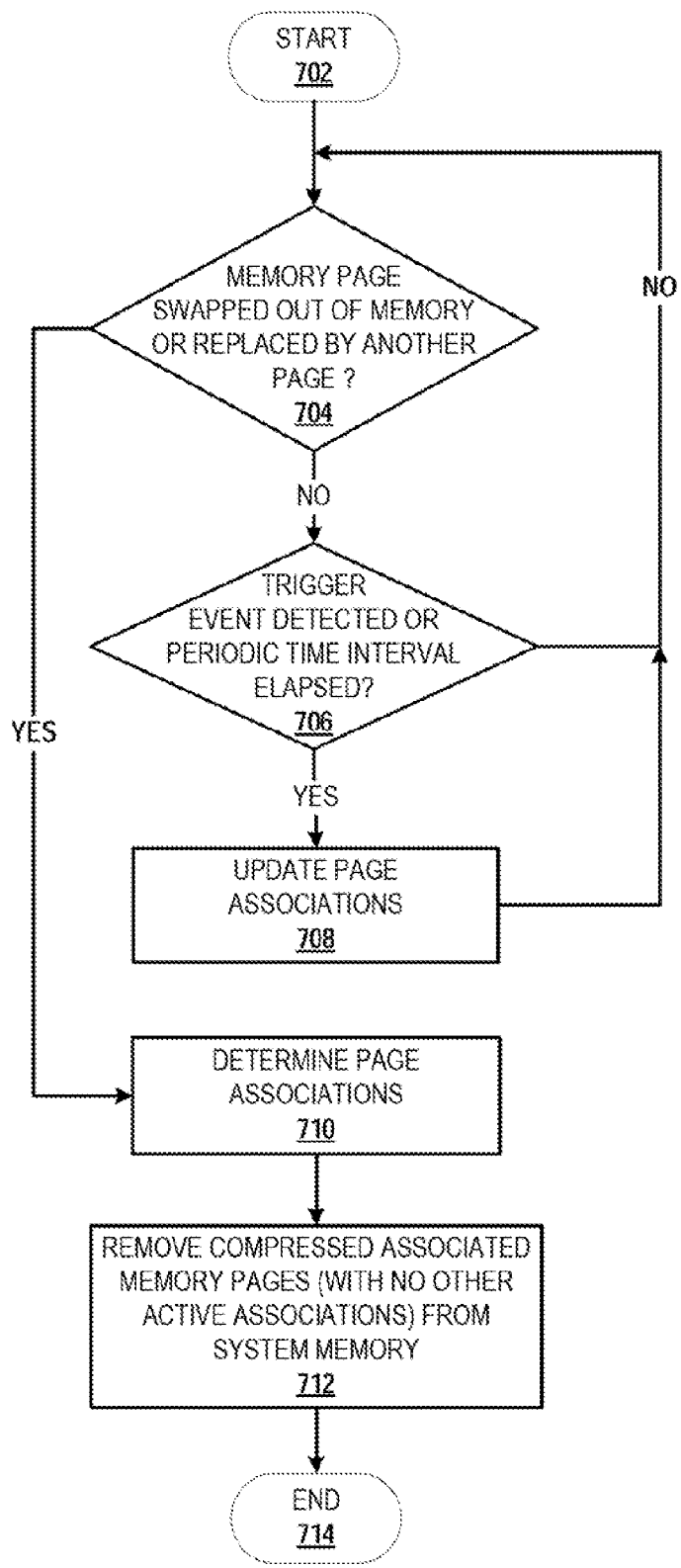
FIG. 7 is a flow chart illustrating one example of a method of updating memory page entries within computer memory and updating memory page associations, according to one or more embodiments

FIG. 7 illustrates a flowchart of an exemplary process for updating memory page entries within computer memory and memory page associations, according to one or more embodiments presented herein. Computer implemented method 700 can be implemented in DPS 100. The description of the method is provided with general reference to the specific components illustrated within the preceding figures. Generally the method is described as being implemented via controller logic 210 and particularly the execution of code provided by firmware 124 and software 126 acting within modules 220 and 225 (FIG. 2). It is however appreciated that certain aspects of the described methods may be implemented via other processing devices and/or execution of other code.

Method 700 begins at start block 702 and proceeds to block 704 at which controller logic 210 determines if a previously requested memory page is being swapped out of system memory 120 and/or being replaced by another memory page. When the requested memory page is not being swapped out or replaced, controller logic 210 determines at block 706 whether a trigger event (of one or more pre-established trigger events that updates the memory page associations) has been detected and/or the pre-established periodic time interval for updating the associations has elapsed. Controller logic 210 continues to monitor for the swapping out of a memory page and/or the occurrence of a trigger event or interval timeout, as indicated by the return arrow along the "no" path from block 706. In response to either the detection of the trigger event or the expiration of the pre-established time interval, association module 220 updates one or more of the associations between the various memory pages (block 708). Method 500 cycles back to block 704. In response to a memory page being swapped out or replaced, association module 220 determines the page associations of the swapped out or replaced memory pages (block 710). Next, at block 712, controller logic 210 removes or pushes out the compressed associated memory pages that have no active associations from system memory 120. In one embodiment, only compressed associated memory pages that are not associated with another memory page within memory are pushed out of memory. According to one implementation, the memory page is removed (i.e., not swapped back to storage) if the page contains an executable code, such as an AIX executable code; However all other pages can be swapped back, in one embodiment. Based on the particular OS implementation, the OS can be programmed to make a determination to either throw out a page or re-page the page back to the device from which the memory page was initially retrieved. During a pull in of a targeted memory page from storage, only new associated pages that are not already in system memory are pulled in and compressed to avoid any duplication of pages within system memory 120. Method 500 ends at block 714.

One or more of the described embodiments provide a method for management of computer memory operations using cognitive factors and associations to enable faster access to memory pages during processing operations. Responsive to a request for a first memory page, the first memory page is read from a storage device. The first memory page is stored to a system memory. At least one page association is determined for the first memory page based on a pre-established set of association rules. One or more associated memory pages are identified that are related to the first memory page by the set of association rules. The associated memory pages are read from the storage device and compressed to generate a corresponding compressed associated memory page. The compressed associated memory pages are stored to the system memory to enable faster access to the associated memory pages during processing involving the first memory page.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of managing memory operations, the method comprising:
   responsive to a request for a first memory page, reading the first memory page from a storage device;
   determining at least one page association for the first memory page based on a pre-established set of association rules, said determining further comprising at least one of:
      generating an average associativity factor, the average associativity factor defined as a sum of a degree of association for each of the page associations divided by a time period;
      generating a differential associativity factor, the differential associativity factor defined as a current associativity factor minus a sum of a degree of association for each page association divided by a time period; and
      generating an association quotient, the association quotient defined as a total number of consistent page associations divided by a total number of page associations;
   identifying one or more associated memory pages that are related to the first memory page by the set of pre-established association rules;
   reading each of the one or more associated memory pages from the storage device;
   compressing each of the one or more associated memory pages to generate a corresponding compressed associated memory page; and
   storing the compressed associated memory page to the system memory to enable faster access to the associated memory pages during processing of the first memory page.

2. The method of claim 1, further comprising:
   storing the first memory page to a system memory;
   determining if the first memory page has been removed from the system memory; and
   responsive to the first memory page being removed from the system memory, removing the one or more compressed associated memory pages from the system memory.

3. The method of claim 1, further comprising:
   binding the page association to the first memory page, wherein identifying the one or more associated memory pages comprises reading the page association bound to the first memory page.

4. The method of claim 1, further comprising:
   tracking one or more trigger conditions, the trigger conditions including trends in memory page access, memory page heuristics and previous trends of memory pages; and
   re-determining the page association on a periodic basis based on one or more of the trigger conditions.

5. The method of claim 1, wherein determining the page association further comprises:
   tracking at least one memory access trend;
   evaluating the memory access trend against the pre-established set of association rules; and
   determining a degree of association for each page association based on the memory access trend.

6. The method of claim 1, further comprising:
   responsive to a request for a second memory page, checking a page table;
   determining if the second memory page is present in the page table; and
   responsive to the second memory page being present in the page table, determining an address of one or more of the corresponding compressed associated memory pages.

* * * * *